US011713393B2

(12) United States Patent
Gabriel et al.

(10) Patent No.: US 11,713,393 B2
(45) Date of Patent: Aug. 1, 2023

(54) SINTERED POWDER (SP) CONTAINING A PARTIALLY CRYSTALLINE TEREPHTHALATE POLYESTER, AN AMORPHOUS TEREPHTHALATE POLYESTER AND A PHOSPHINIC ACID SALT

(71) Applicant: BASF SE, Ludwigshafen am Rhein (DE)

(72) Inventors: Claus Gabriel, Ludwigshafen am Rhein (DE); Angelika Zepp, Ludwigshafen am Rhein (DE); Thomas Meier, Ludwigshafen am Rhein (DE); Natalie Beatrice Janine Herle, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 226 days.

(21) Appl. No.: 17/272,331

(22) PCT Filed: Aug. 21, 2019

(86) PCT No.: PCT/EP2019/072397
§ 371 (c)(1),
(2) Date: Feb. 28, 2021

(87) PCT Pub. No.: WO2020/043573
PCT Pub. Date: Mar. 5, 2020

(65) Prior Publication Data
US 2021/0332232 A1  Oct. 28, 2021

(30) Foreign Application Priority Data

Aug. 30, 2018 (EP) .................... 18191799

(51) Int. Cl.
*C08L 67/02* (2006.01)
*B33Y 10/00* (2015.01)
(Continued)

(52) U.S. Cl.
CPC ............ *C08L 67/02* (2013.01); *B29C 64/153* (2017.08); *B29C 64/314* (2017.08); *B33Y 10/00* (2014.12);
(Continued)

(58) Field of Classification Search
CPC ................. C08L 67/02; C08L 2203/30; C08L 2205/025; B29C 64/153; B29C 64/314;
(Continued)

(56) References Cited

U.S. PATENT DOCUMENTS 6,136,948 A  10/2000  Dickens et al.
2002/0172823 A1*  11/2002  Griffith ..................... D01F 6/92
525/437

(Continued)

FOREIGN PATENT DOCUMENTS

JP   2017019267   *  1/2017  ............. B29C 70/58
WO   96/06881 A2   3/1996
WO   2017/063841 A1   4/2017

OTHER PUBLICATIONS

International Preliminary Report on Patentability received for PCT Patent Application No. PCT/EP2019/072397, dated Mar. 4, 2021, 8 pages.

(Continued)

*Primary Examiner* — Nahida Sultana
(74) *Attorney, Agent, or Firm* — Faegre Drinker Biddle & Reath LLP

(57) ABSTRACT

The present invention relates to a sinter powder (SP) comprising at least one semicrystalline terephthalate polyester (A), at least one amorphous terephthalate polyester (B) and
(Continued)

at least one phosphinic salt (C). The present invention further relates to a method of producing a shaped body by sintering the sinter powder (SP) or by an FFF (fused filament fabrication) method, to a shaped body obtainable by the method of the invention, and to the use of a phosphinic salt in a sinter powder (SP) for broadening the sintering window ($W_{SP}$) of the sinter powder (SP).

15 Claims, 1 Drawing Sheet

(51) Int. Cl.
*B33Y 70/00* (2020.01)
*B29C 64/314* (2017.01)
*B29C 64/153* (2017.01)
*B33Y 40/10* (2020.01)
*B29K 67/00* (2006.01)

(52) U.S. Cl.
CPC ............... *B33Y 40/10* (2020.01); *B33Y 70/00* (2014.12); *B29K 2067/006* (2013.01); *C08L 2203/30* (2013.01); *C08L 2205/025* (2013.01)

(58) Field of Classification Search
CPC ......... B33Y 10/00; B33Y 40/10; B33Y 70/00; B29K 2067/006; C08J 3/12; C08J 2367/02; C08K 5/5313
See application file for complete search history.

(56) References Cited

U.S. PATENT DOCUMENTS

| 2010/0160547 | A1 | 6/2010 | Martinoni | |
|---|---|---|---|---|
| 2020/0308396 | A1* | 10/2020 | Barger | C08G 63/199 |
| 2021/0269629 | A1* | 9/2021 | Liu | D01F 6/80 |

OTHER PUBLICATIONS

International Search Report and Written Opinion received for PCT Patent Application No. PCT/EP2019/072397, dated Sep. 6, 2019, 12 pages (2 pages of English Translation and 10 pages of Original Document).

* cited by examiner

SINTERED POWDER (SP) CONTAINING A PARTIALLY CRYSTALLINE TEREPHTHALATE POLYESTER, AN AMORPHOUS TEREPHTHALATE POLYESTER AND A PHOSPHINIC ACID SALT

CROSS-REFERENCE TO RELATED APPLICATIONS

This application is a national stage application (under 35 U.S.C. § 371) of PCT/EP2019/072397, filed Aug. 21, 2019, which claims benefit of European Application No. 18191799.8, filed Aug. 30, 2018, both of which are incorporated herein by reference in their entirety.

The present invention relates to a sinter powder (SP) comprising at least one semicrystalline terephthalate polyester (A), at least one amorphous terephthalate polyester (B) and at least one phosphinic salt (C). The present invention further relates to a method of producing a shaped body by sintering the sinter powder (SP) or by an FFF (fused filament fabrication) method, to a shaped body obtainable by the method of the invention, and to the use of a phosphinic salt in a sinter powder (SP) for broadening the sintering window ($W_{SP}$) of the sinter powder (SP).

The rapid provision of prototypes is a problem often addressed in recent times. One method which is particularly suitable for this "rapid prototyping" is selective laser sintering (SLS). This involves selectively irradiating a plastic powder in a chamber with a laser beam. The powder melts, the molten particles coalesce and resolidify. Repeated application of plastic powder and subsequent irradiation with a laser allows modeling of three-dimensional shaped bodies.

The method of selective laser sintering for producing shaped bodies from pulverulent polymers is described in detail in patent specifications U.S. Pat. No. 6,136,948 and WO 96/06881.

A further development of selective laser sintering is high-speed sintering (HSS) or what is called multijet fusion technology (MJF) from HP. In high-speed sintering, by spray application of an infrared-absorbing ink onto the component cross section to be sintered, followed by exposure with an infrared source, a higher processing speed is achieved compared to selective laser sintering.

A factor of particular significance in high-speed sintering or multijet fusion technology and also in selective laser sintering is the sintering window of the sinter powder. This should be as broad as possible in order to reduce warpage of components in the laser sintering operation. Moreover, the recyclability of the sinter powder is of particular significance. For this reason, particularly the processing of semicrystalline terephthalate polyester-based sinter powders is frequently difficult since semicrystalline terephthalate polyesters have a narrow sintering window and crystallize very quickly, and so components having high warpage are frequently obtained.

US2010160547 describes a method of producing shaped bodies by selective laser sintering of a sinter powder comprising a terephthalate polyester.

A disadvantage of the sinter powders described in the prior art for production of shaped bodies by selective laser sintering is that the sintering window of the sinter powders is frequently insufficiently broad, such that the shaped bodies frequently warp during production by selective laser sintering. This warpage virtually rules out use or further processing of the shaped bodies. Even during the production of the shaped bodies, the warpage can be so severe that further layer application is impossible and therefore the production process has to be stopped.

It is thus an object of the present invention to provide a sinter powder which, in a method of producing shaped bodies by laser sintering, has the aforementioned disadvantages of the sinter powders and methods described in the prior art only to a lesser degree, if at all. The sinter powder and the method should respectively be producible and performable in a very simple and inexpensive manner.

Figure 1:
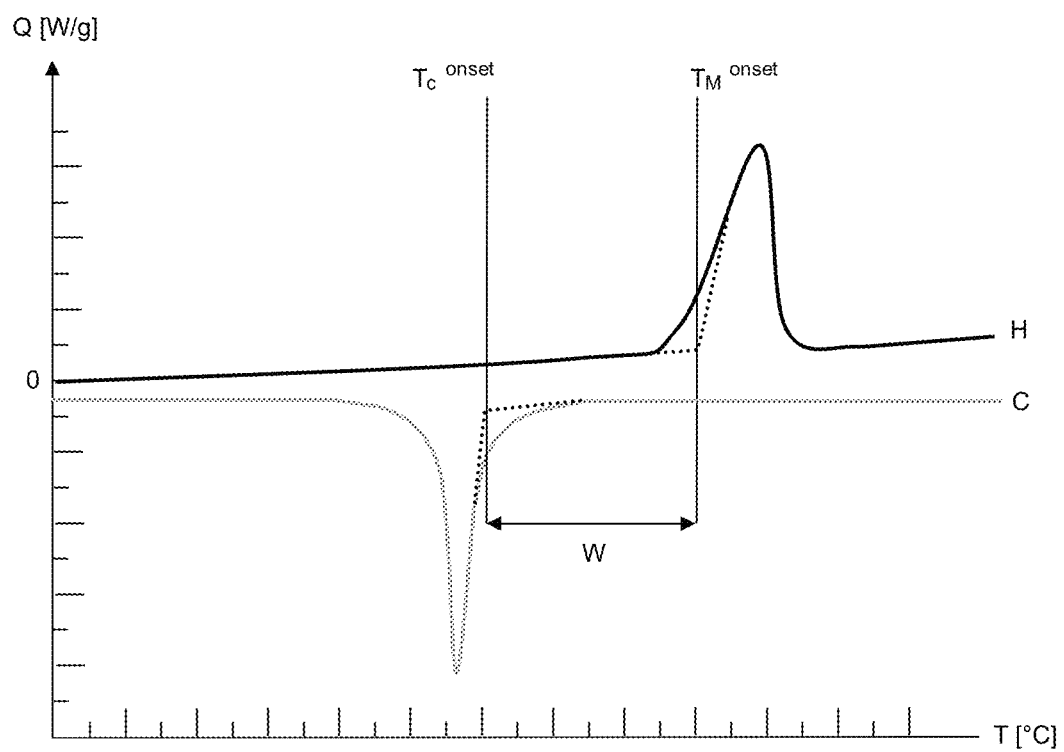
FIG. 1 shows a DSC diagram depicting a heating run (H) and a cooling run (C).--

This object is achieved by a sinter powder (SP) comprising the following components:
(A) at least one semicrystalline terephthalate polyester,
(B) at least one amorphous terephthalate polyester,
(C) at least one phosphinic salt of the general formula (I)

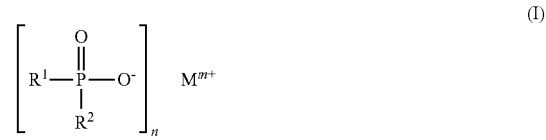

in which $R^1$ and $R^2$ are independently hydrogen or $C_1$-$C_8$-alkyl;

M is $(C_1$-$C_4$-alkyl$)_4$N, $(C_1$-$C_4$-alkyl$)_3$NH, $(C_2$-$C_4$-alkylOH$)_4$N, $(C_2$-$C_4$alkylOH$)_3$NH, $(C_2$-$C_4$-alkylOH$)_2$N$(CH_3)_2$, $(C_2$-$C_4$-alkylOH$)_2$NHCH$_3$, $(C_6H_5)_4$N, $(C_6H_5)$NH, $(C_6H_4CH_3)_4$N, $(C_6H_4CH_3)_3$NH, NH$_4$, an alkali metal ion, an alkaline earth metal ion, an aluminum ion, a zinc ion, an iron ion or a boron ion;

m is 1, 2 or 3 and indicates the number of positive charges of M; and n is 1, 2 or 3 and indicates the number of phosphinic anions.

The present invention further provides for the use of a sinter powder (SP) in a sintering method or in a fused filament fabrication method.

The present invention further provides for the use of a phosphinic salt of the general formula (I)

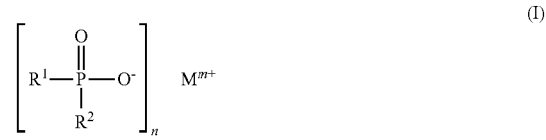

in which $R^1$ and $R^2$ are independently hydrogen or $C_1$-$C_8$-alkyl;

M is $(C_1$-$C_4$-alkyl$)_4$N, $(C_1$-$C_4$-alkyl$)_3$NH, $(C_2$-$C_4$-alkylOH$)_4$N, $(C_2$-$C_4$alkylOH$)_3$NH, $(C_2$-$C_4$-alkylOH$)_2$N$(CH_3)_2$, $(C_2$-$C_4$-alkylOH$)_2$NHCH$_3$, $(C_6H_5)_4$N, $(C_6H_5)$NH, $(C_6H_4CH_3)_4$N, $(C_6H_4CH_3)_3$NH, NH$_4$, an alkali metal ion, an alkaline earth metal ion, an aluminum ion, a zinc ion, an iron ion or a boron ion;

m is 1, 2 or 3 and indicates the number of positive charges of M; and n is 1, 2 or 3 and indicates the number of phosphinic anions, for broadening the sintering window ($W_{SP}$) of a sinter powder (SP).

It has been found that, surprisingly, the sinter powder (SP) of the invention has such a broadened sintering window ($W_{SP}$) that the shaped body produced by sintering the sinter powder (SP) has reduced warpage to some degree. In addition, the recyclability of the sinter powder (SP) used in the method of the invention is high to some degree even after thermal aging. This means that sinter powder (SP) not melted in the production of the shaped body can in some cases be reused. Even after several laser sintering cycles, the sinter powder (SP) has similarly advantageous sintering properties to those in the first sintering cycle.

Sinter Powder (SP)

According to the invention, the sinter powder (SP) comprises at least one semicrystalline terephthalate polyester as component (A), at least one amorphous terephthalate polyester as component (B), and at least one phosphinic salt of the general formula (I) as component (C).

The present invention thus also provides a sinter powder (SP) comprising in the range from 50% to 90% by weight of component (A), in the range from 5% to 25% by weight of component (B) and in the range from 5% to 25% by weight of component (C), based in each case on the sum total of the percentages by weight of (A), (B) and (C), preferably based on the total weight of the sinter powder (SP).

The sinter powder (SP) may additionally optionally comprise at least one additive as component (D) and at least one reinforcer as component (E).

The present invention therefore also provides a sinter powder (SP) comprising the following components:
  (A) at least one semicrystalline terephthalate polyester,
  (B) at least one amorphous terephthalate polyester,
  (C) at least one phosphinic salt of the general formula (I),
  (D) optionally at least one additive and
  (E) optionally at least one reinforcer.

In the context of the present invention the terms "component (A)" and "at least one semicrystalline terephthalate polyester" are used synonymously and therefore have the same meaning.

The same applies to the terms "component (B)" and "at least one amorphous terephthalate polyester". These terms are likewise used synonymously in the context of the present invention and therefore have the same meaning.

Accordingly, the terms "component (C)" and "at least one phosphinic salt of the general formula (I)", "component (D)" and "at least one additive", and "component (E)" and "at least one reinforcer" are also each used synonymously in the context of the present invention and have the same meaning.

The sinter powder (SP) may comprise components (A), (B) and (C) and optionally (D) and (E) in any desired amounts.

For example, the sinter powder (SP) comprises in the range from 50% to 90% by weight of component (A), in the range from 5% to 25% by weight of component (B), in the range from 5% to 30% by weight of component (C), in the range from 0% to 10% by weight of component (D) and in the range from 0% to 40% by weight of component (E), based in each case on the sum total of the percentages by weight of components (A), (B), (C) and optionally (D) and (E), preferably based on the total weight of the sinter powder (SP).

The sinter powder (SP) preferably comprises in the range from 55% to 83.9% by weight of component (A), in the range from 8% to 23% by weight of component (B), in the range from 8% to 28% by weight of component (C), in the range from 0.1% to 2.5% by weight of component (D) and in the range from 0% to 28.9% by weight of component (E), based in each case on the sum total of the percentages by weight of components (A), (B), (C), (D) and optionally (E), preferably based on the total weight of the sinter powder (SP).

The sinter powder (SP) most preferably comprises in the range from 60% to 79.9% by weight of component (A), in the range from 10% to 20% by weight of component (B), in the range from 10% to 25% by weight of component (C), in the range from 0.1% to 2% by weight of component (D) and in the range from 0% to 19.9% by weight of component (E), based in each case on the sum total of the percentages by weight of components (A), (B), (C), (D) and optionally (E), preferably based on the total weight of the sinter powder (SP).

The percentages by weight of components (A), (B) and (C) and optionally of components (D) and (E) typically add up to 100% by weight.

The sinter powder (SP) comprises particles. These particles have, for example, a size ($D_{50}$) in the range from 10 to 250 μm, preferably in the range from 15 to 200 μm, more preferably in the range from 20 to 120 μm and especially preferably in the range from 20 to 110 μm.

The sinter powder (SP) of the invention has, for example,
  a D10 in the range from 10 to 60 μm,
  a D50 in the range from 25 to 90 μm and
  a D90 in the range from 50 to 150 μm.

Preferably, the sinter powder (SP) of the invention has
  a D10 in the range from 20 to 50 μm,
  a D50 in the range from 40 to 80 μm and
  a D90 in the range from 80 to 125 μm.

The present invention therefore also provides a sinter powder (SP), wherein the sinter powder has a median particle size (D50) in the range from 10 to 250 μm.

The present invention therefore also provides a sinter powder (SP), wherein the sinter powder (SP) has
  a D10 in the range from 10 to 60 μm,
  a D50 in the range from 25 to 90 μm and
  a D90 in the range from 50 to 150 μm.

In the context of the present invention, the "D10" is understood to mean the particle size at which 10% by volume of the particles based on the total volume of the particles are smaller than or equal to D10 and 90% by volume of the particles based on the total volume of the particles are larger than D10. By analogy, the "D50" is understood to mean the particle size at which 50% by volume of the particles based on the total volume of the particles are smaller than or equal to D50 and 50% by volume of the particles based on the total volume of the particles are larger than D50. Correspondingly, the "D90" is understood to mean the particle size at which 90% by volume of the particles based on the total volume of the particles are smaller than or equal to D90 and 10% by volume of the particles based on the total volume of the particles are larger than D90.

To determine the particle sizes, the sinter powder (SP) is suspended in a dry state using compressed air or in a solvent, for example water or ethanol, and this suspension is analyzed. The D10, D50 and D90 values are determined by laser diffraction using a Malvern Mastersizer 3000. Evaluation is by means of Fraunhofer diffraction.

The sinter powder (SP) typically has a melting temperature ($T_M$) in the range from 150 to 260° C. Preferably, the melting temperature ($T_M$) of the sinter powder (SP) is in the range from 160 to 250° C. and especially preferably in the range from 170 to 240° C.

The melting temperature ($T_M$) is determined in the context of the present invention by means of differential scanning calorimetry (DSC). Typically, a heating run (H) and a cooling run (C) are measured, each at a heating rate/cooling rate of 20 K/min. This affords a DSC diagram as shown by way of example in FIG. 1. The melting temperature ($T_M$) is then understood to mean the temperature at which the melting peak of the heating run (H) of the DSC diagram has a maximum.

The sinter powder (SP) typically also has a crystallization temperature ($T_C$) in the range from 110 to 210° C. Preferably, the crystallization temperature ($T_C$) of the sinter powder (SP) is in the range from 120 to 200° C. and especially preferably in the range from 130 to 195° C.

The crystallization temperature ($T_C$) is determined in the context of the present invention by means of differential scanning calorimetry (DSC). This typically involves measuring a heating run (H) and a cooling run (C), each at a heating rate and a cooling rate of 20 K/min. This affords a DSC diagram as shown by way of example in FIG. 1. The crystallization temperature ($T_C$) is then the temperature at the minimum of the crystallization peak of the DSC curve.

The sinter powder (SP) typically also has a sintering window ($W_{SP}$). The sintering window ($W_{SP}$) is, as described below, the difference between the onset temperature of melting ($T_M^{onset}$) and the onset temperature of crystallization ($T_C^{onset}$). The onset temperature of melting ($T_M^{onset}$) and the onset temperature of crystallization ($T_C^{onset}$) are determined as described hereinafter with regard to step ii).

The sintering window ($W_{SP}$) of the sinter powder (SP) is, for example, in the range from 10 to 40 K (kelvin), more preferably in the range from 15 to 35 K and especially preferably in the range from 18 to 33 K.

The sinter powder (SP) can be produced by any methods known to those skilled in the art. For example, the sinter powder is produced by grinding, by precipitation or by microgranulation.

If the sinter powder (SP) is produced by precipitation, components (A), (B), (C) and optionally (D) and (E) are typically mixed with a solvent, and components (A) and (B) are optionally dissolved in the solvent while heating to obtain a solution. The sinter powder (SP) is subsequently precipitated, for example by cooling the solution, distilling the solvent out of the solution or adding a precipitant to the solution.

The grinding can be conducted by any methods known to those skilled in the art; for example, components (A), (B) and (C) and optionally (D) and (E) are introduced into a mill and ground therein.

Suitable mills include all mills known to those skilled in the art, for example classifier mills, opposed jet mills, hammer mills, ball mills, vibratory mills or rotor mills such as pinned disk mills and whirlwind mills.

The grinding in the mill can likewise be effected by any methods known to those skilled in the art. For example, the grinding can take place under inert gas and/or while cooling with liquid nitrogen. Cooling with liquid nitrogen is preferred. The temperature in the grinding is as desired; the grinding is preferably performed at liquid nitrogen temperatures, for example at a temperature in the range from −210 to −195° C. The temperature of the components on grinding in that case is, for example, in the range from −40 to −30° C.

Preferably, the components are first mixed with one another and then ground. The method of producing the sinter powder (SP) in that case preferably comprises the steps of a) mixing the following components:
(A) at least one semicrystalline terephthalate polyester,
(B) at least one amorphous terephthalate polyester,
(C) at least one phosphinic salt of the general formula (I),
(D) optionally at least one additive and
(E) optionally at least one reinforcer, b) grinding the mixture obtained in step a) to obtain the sinter powder (SP).

The present invention therefore also provides a method of producing a sinter powder (SP), comprising the steps of a) mixing the following components:
(A) at least one semicrystalline terephthalate polyester,
(B) at least one amorphous terephthalate polyester,
(C) at least one phosphinic salt of the general formula (I)

in which $R^1$ and $R^2$ are independently hydrogen or $C_1$-$C_8$-alkyl;

M is ($C_1$-$C_4$-alkyl)$_4$N, ($C_1$-$C_4$-alkyl)$_3$NH, ($C_2$-$C_4$-alkylOH)$_4$N, ($C_2$-$C_4$alkylOH)$_3$NH, ($C_2$-$C_4$-alkylOH)$_2$N(CH$_3$)$_2$, ($C_2$-$C_4$-alkylOH)$_2$NHCH$_3$, ($C_6$H$_5$)$_4$N, ($C_6$H$_5$)NH, ($C_6$H$_4$CH$_3$)$_4$N, ($C_6$H$_4$CH$_3$)$_3$NH, NH$_4$, an alkali metal ion, an alkaline earth metal ion, an aluminum ion, a zinc ion, an iron ion or a boron ion;

m is 1, 2 or 3 and indicates the number of positive charges of M; and n is 1, 2 or 3 and indicates the number of phosphinic anions; and b) grinding the mixture obtained in step a) to obtain the sinter powder (SP).

In a preferred embodiment, the method of producing the sinter powder (SP) comprises the following steps:

ai) mixing the following components:
(A) at least one semicrystalline terephthalate polyester,
(B) at least one amorphous terephthalate polyester,
(C) at least one phosphinic salt of the general formula (I),
(D) optionally at least one additive and
(E) optionally at least one reinforcer, bi) grinding the mixture obtained in step ai) to obtain a terephthalate polyester powder, bii) mixing the terephthalate polyester powder obtained in step bi) with a flow aid to obtain the sinter powder (SP).

Suitable flow aids are, for example, silicas or aluminas. An example of a suitable alumina is Aeroxide® Alu C from Evonik.

If the sinter powder (SP) comprises a flow aid, it is preferably added in method step bii). In one embodiment, the sinter powder (SP) comprises 0.02% to 1% by weight, preferably 0.05% to 0.8% by weight and more preferably 0.1% to 0.6% by weight of flow aid, based in each case on the total weight of the sinter powder (SP) and the flow aid.

Processes for compounding (for mixing) in step a) are known as such to those skilled in the art. For example, the mixing can be effected in an extruder, especially preferably in a twin-screw extruder.

In respect of the grinding in step b), the details and preferences described above are correspondingly applicable with regard to the grinding.

The present invention therefore also further provides the sinter powder (SP) obtainable by the method of the invention.

Component (A)

According to the invention, component (A) is at least one semicrystalline terephthalate polyester.

In the context of the present invention, "at least one semicrystalline terephthalate polyester (A)" means either exactly one semicrystalline terephthalate polyester (A) or a mixture of two or more semicrystalline terephthalate polyesters (A).

"Semicrystalline" in the context of the present invention means that the semicrystalline terephthalate polyester (A) has an enthalpy of fusion $\Delta H2_{(A)}$ of greater than 20 J/g, preferably of greater than 25 J/g and especially preferably of greater than 30 J/g, in each case measured by means of differential scanning calorimetry (DSC) according to ISO 11357-4:2014.

The at least one semicrystalline terephthalate polyester (A) of the invention thus typically has an enthalpy of fusion $\Delta H2_{(A)}$ of greater than 20 J/g, preferably of greater than 25 J/g and especially preferably of greater than 30 J/g, in each case measured by means of differential scanning calorimetry (DSC) according to ISO 11357-4:2014.

The at least one semicrystalline terephthalate polyester (A) of the invention typically has an enthalpy of fusion $\Delta H2_{(A)}$ of less than 200 J/g, preferably of less than 150 J/g and especially preferably of less than 100 J/g, in each case measured by means of differential scanning calorimetry (DSC) according to ISO 11357-4:2014.

Suitable semicrystalline terephthalate polyesters (A) generally have a viscosity number (VN(A)) in the range from 50 to 220 mL/g, preferably in the range from 80 to 210 mL/g and especially preferably in the range from 90 to 200 mL/g, determined in a 0.5% by weight solution in a phenol/o-dichlorobenzene mixture (weight ratio 1:1 at 25° C.) to ISO 1628.

Component (A) of the invention typically has a melting temperature ($T_{M(A)}$). Preferably, the melting temperature ($T_{M(A)}$) of component (A) is in the range from 160 to 280° C., more preferably in the range from 170 to 270° C. and especially preferably in the range from 175 to 265° C., determined to ISO 11357-3:2014.

Suitable components (A) have a weight-average molecular weight ($M_{W(A)}$) in the range from 500 to 2 000 000 g/mol, preferably in the range from 10 000 to 90 000 g/mol and especially preferably in the range from 20 000 to 70 000 g/mol. The weight-average molecular weight ($M_{W(A)}$) is determined by means of SEC-MALLS (Size Exclusion Chromatography-Multi-Angle Laser Light Scattering) according to Chi-san Wu "Handbook of size exclusion chromatography and related techniques", page 19.

Examples of semicrystalline terephthalate polyesters (A) are polyethylene terephthalate (PET), polytrimethylene terephthalate (PTT) or polybutylene terephthalate (PBT).

The semicrystalline terephthalate polyester (A) can be prepared by all methods known to those skilled in the art.

In a preferred embodiment, the semicrystalline terephthalate polyester (A) is prepared by polycondensation of at least one diol (m1) and at least one terephthalic acid (derivative). According to the invention, "at least one terephthalic acid (derivative)" means exactly one terephthalic acid (derivative) and mixtures of two or more terephthalic acid (derivatives). According to the invention, "at least one diol (m1)" means exactly one diol (m1) and mixtures of two or more diols (m1).

In the context of the present invention, terephthalic acid (derivatives) mean terephthalic acid itself and derivatives of terephthalic acid such as terephthalic esters. Useful terephthalic esters include the di-$C_1$-$C_6$-alkyl esters of terephthalic acid, for example the dimethyl, diethyl, di-n-propyl, diisopropyl, di-n-butyl, diisobutyl, di-t-butyl, di-n-pentyl, diisopentyl or di-n-hexyl esters of terephthalic acid.

Terephthalic acid or its derivatives can be used individually or as a mixture of two or more thereof. Particular preference is given to using terephthalic acid or dimethyl terephthalate. Preference is given to semicrystalline terephthalate polyesters (A) that are prepared using at least 90 mol %, preferably at least 95 mol %, of terephthalic acid, based in each case on the total weight of the terephthalic acid (derivative) used.

Component (m1) is preferably at least one aliphatic 1,ω-diol.

Examples of aliphatic 1,ω-diols (m1) are ethylene glycol (ethane-1,2-diol), propane-1,3-diol, butane-1,4-diol, pentane-1,5-diol or hexane-1,6-diol.

In the context of the present invention, the aliphatic 1,ω-diol (m1) is preferably an aliphatic 1,ω-diol having 2 to 12, preferably 4 to 6, carbon atoms. The aliphatic 1,ω-diol (m1) may be linear or branched.

Particularly preferred aliphatic 1,ω-diols (m1) are ethylene glycol, propane-1,3-diol, butane-1,4-diol, most preferably butane-1,4-diol.

Preference is given to semicrystalline terephthalate polyesters (A) that are prepared using at least 90 mol %, preferably at least 95 mol %, of butane-1,4-diol, based in each case on the total weight of the diols (m1).

Polyethylene terephthalate (PET) is prepared, for example, from terephthalic acid and ethylene glycol, and polybutylene terephthalate (PBT) from terephthalic acid and butane-1,4-diol. Examples of commercially available polybutylene terephthalates (PBT) are Ultradur B 4500®, Ultradur B 4520® and Ultradur B 2550 FCC® from the manufacturer BASF SE in Ludwigshafen.

Preferably, the at least one semicrystalline terephthalate polyester (A) is a polyethylene terephthalate (PET) and/or polybutylene terephthalate (PBT); the at least one semicrystalline terephthalate polyester (A) is especially preferably a polybutylene terephthalate (PBT).

The present invention thus also provides a method of producing polyester fibers (PF), in which the at least one semicrystalline terephthalate polyester (A) is polyethylene terephthalate (PET) and/or polybutylene terephthalate (PBT).

Polybutylene terephthalate (PBT) which is especially preferred in accordance with the invention as semicrystalline terephthalate polyester (A) generally has a melting temperature ($T_M$) in the range from 180 to 250° C., preferably in the range from 210 to 240° C., determined by differential scanning calorimetry (DSC) at a heating and cooling rate of 10° C./min.

Polyethylene terephthalate (PET) which is preferred in accordance with the invention as semicrystalline terephthalate polyester (A) generally has a melting temperature ($T_M$) in the range from 220 to 280° C., preferably in the range from 230 to 270° C., determined by differential scanning calorimetry (DSC) at a heating and cooling rate of 10° C./min.

Component (B)

According to the invention, component (B) is at least one amorphous terephthalate polyester.

In the context of the present invention, "at least one amorphous terephthalate polyester (B)" means either exactly one amorphous terephthalate polyester (B) or a mixture of two or more amorphous terephthalate polyesters (B).

In one embodiment, "amorphous" in the context of the present invention means that the amorphous terephthalate polyester (B) generally comprises not more than 2.5% by weight, preferably not more than 1.5% by weight, more preferably not more than 1.0% by weight, even more preferably not more than 0.5% by weight, especially preferably not more than 0.1% by weight and most preferably not more than 0.01% by weight of crystalline terephthalate polyester, based in each case on the total weight of the amorphous terephthalate polyester (B). In a further, especially preferred embodiment, the amorphous terephthalate polyester (B) does not comprise any crystalline terephthalate polyester.

In a further embodiment, "amorphous" in the context of the present invention means that the terephthalate polyester (B) generally comprises at least 97.5% by weight, preferably at least 98.5% by weight, more preferably at least 99% by weight, even more preferably at least 99.5% by weight, especially preferably at least 99.9% by weight and most preferably at least 99.99% by weight of vitreously solidified terephthalate polyester having no order in the polymer chains, for example crystallites or superstructures detectable by x-ray methods, based in each case on the total weight of the terephthalate polyester (B). In a further, especially preferred embodiment, the terephthalate polyester (B) consists of terephthalate polyester having a vitreously solidified state in which no order in the polymer chains, for example crystallites or superstructures, is detectable by x-ray methods.

In a further, especially preferred embodiment, the at least one amorphous terephthalate polyester (B) has no melting point in differential scanning calorimetry (DSC) measured to ISO 11357.

The at least one amorphous terephthalate polyester (B) generally has a glass transition temperature ($T_G$). The glass transition temperature ($T_G$) of component (B) is generally in the range from 0 to 200° C., preferably in the range from 25 to 180° C. and especially preferably in the range from 5 to 150° C.

The glass transition temperature ($T_G$) of the amorphous terephthalate polyester (B) is determined by means of differential scanning calorimetry. The glass transition temperature ($T_G$) of the amorphous terephthalate polyester (B) is determined in accordance with the invention by first measuring a first heating run (H1), then a cooling run (K) and subsequently a second heating run (H2) with a sample of the amorphous terephthalate polyester (B) (starting weight: 8.5 g). The heating rate in the first heating run (H1) and in the second heating run (H2) is 20 K/min; the cooling rate in the cooling run (C) is likewise 20 K/min. A step in the DSC diagram is obtained in the region of the glass transition of the amorphous terephthalate polyester (B) in the second heating run (H2). The glass transition temperature of the amorphous terephthalate polyester (B) corresponds to the temperature at half the step height in the DSC diagram. This method of determining the glass transition temperature is known to those skilled in the art.

Suitable components (B) generally have a weight-average molecular weight ($M_{W(B)}$) in the range from 5000 to 500 000 g/mol. The weight-average molecular weight ($M_{W(B)}$) is determined by means of SEC-MALLS (size exclusion chromatography/multi-angle laser light scattering) according to Chi-san Wu "Handbook of size exclusion chromatography and related techniques", page 19.

Suitable amorphous terephthalate polyesters (B) generally have a viscosity number (VN(B)) in the range from 50 to 300 mL/g, preferably in the range from 75 to 250 mL/g and especially preferably in the range from 100 to 225 mL/g, determined in a 0.5% by weight solution in a phenol/o-dichlorobenzene mixture (weight ratio 1:1 at 25° C.) to ISO 1628.

In a preferred embodiment, the amorphous terephthalate polyester (B) is prepared by polycondensation of at least one diol (m1), at least one terephthalic acid (derivative) and at least one second diol (m2) and/or at least one second terephthalic acid (derivative), where the above remarks and preferences relating to component (A) are correspondingly applicable to the at least one diol (m1) and the at least one terephthalic acid (derivative).

The second diol (m2) is different than the first diol (m1). The second terephthalic acid (derivative) is different than the terephthalic acid (derivative) which is used to prepare component (A). Component (m2) which is used to prepare component (B) is preferably likewise a 1, ω-diol. Suitable components (m2) are selected, for example, from the group consisting of 2,2-dimethylpropane-1,3-diol, 2-ethyl-2-butylpropane-1,3-diol, 2-ethyl-2-isobutylpropane-1,3-diol, cyclohexane-1,4-dimethanol, 2,2,4-trimethylhexane-1,6-diol, diethylene glycol, triethylene glycol and tetraethylene glycol. Component (m2) is preferably selected from the group consisting of diethylene glycol, triethylene glycol and cyclohexane-1,4-dimethanol. Component (m2) is more preferably selected from the group consisting of diethylene glycol and cyclohexane-1,4-dimethanol.

Suitable second terephthalic acid (derivatives) that can be used to prepare the amorphous terephthalic polyester (B) are, for example, isophthalic acid (derivatives). In the context of the present invention, isophthalic acid (derivatives) mean isophthalic acid itself and derivatives of isophthalic acid such as isophthalic esters. Useful isophthalic esters include the di-$C_1$-$C_6$-alkyl esters of isophthalic acid, for example the dimethyl, diethyl, di-n-propyl, diisopropyl, di-n-butyl, diisobutyl, di-t-butyl, di-n-pentyl, diisopentyl or di-n-hexyl esters of isophthalic acid.

Preference is given to amorphous terephthalate polyesters (B) that are prepared using, as component (m1), ethylene glycol, propane-1,3-diol or butane-1,4-diol. Particular preference is given to amorphous terephthalate polyesters (B) that are prepared using ethylene glycol (ethane-1,2-diol). Especially preferred are amorphous terephthalate polyesters (B) that are prepared using 0.1% to 99.9% by weight, more preferably 0.1% to 50% by weight, of the second diol (m2), based on the total weight of components (m1) and (m2) used for the preparation.

Component (C)

According to the invention, component (C) is at least one phosphinic salt of the general formula (I).

In the context of the present invention, "at least one phosphinic salt of the general formula (I)" means either exactly one phosphinic salt of the general formula (I) or a mixture of two or more phosphinic salts of the general formula (I).

In the general formula (I), m is 1, 2 or 3 and indicates the number of positive charges of M. In the general formula (I), n is 1, 2 or 3 and indicates the number of phosphinic anions present in the phosphinic salt. m and n may have identical or different values. When m and n have different values, the phosphinic salt is positively or negatively charged. Preferably, m and n have the same value, and so the salt is neutral.

In a preferred embodiment, a phosphinic salt of the formula (I')

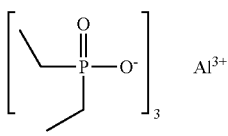

is used as component (C).

The present invention thus also provides a sinter powder (SP), wherein component (C) is a phosphinic salt of the formula (I')

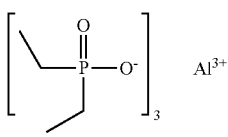

Component (D)

Component (D) is at least one additive.

In the context of the present invention "at least one additive" means either exactly one additive or a mixture of two or more additives.

Additives as such are known to those skilled in the art. For example, the at least one additive is selected from the group consisting of antinucleating agents, stabilizers, conductive additives, end group functionalizers, dyes, antioxidants (preferably sterically hindered phenols) and color pigments.

The present invention therefore also provides a method in which component (D) is selected from the group consisting of antinucleating agents, stabilizers, conductive additives, end group functionalizers, dyes, antioxidants (preferably sterically hindered phenols) and color pigments.

An example of a suitable antinucleating agent is lithium chloride. Suitable stabilizers are, for example, phenols, phosphites and copper stabilizers. Suitable conductive additives are carbon fibers, metals, stainless steel fibers, carbon nanotubes and carbon black. Suitable end group functionalizers are, for example, terephthalic acid, adipic acid and propionic acid. Suitable dyes and color pigments are, for example, carbon black and iron chromium oxides.

An example of a suitable antioxidant is Irganox® 245 from BASF SE.

If the sinter powder comprises component (D), it comprises at least 0.1% by weight of component (D), preferably at least 0.2% by weight of component (D), based on the sum total of the proportions by weight of components (A), (B), (C), (D) and (E), preferably based on the total weight of the sinter powder (SP).

Component (E)

According to the invention, any component (E) present is at least one reinforcer.

In the context of the present invention, "at least one reinforcer" means either exactly one reinforcer or a mixture of two or more reinforcers.

In the context of the present invention, a reinforcer is understood to mean a material that improves the mechanical properties of shaped bodies produced by the method of the invention compared to shaped bodies that do not comprise the reinforcer.

Reinforcers as such are known to those skilled in the art. Component (E) may, for example, be in spherical form, in platelet form or in fibrous form.

Preferably, the at least one reinforcer is in platelet form or in fibrous form.

A "fibrous reinforcer" is understood to mean a reinforcer in which the ratio of length of the fibrous reinforcer to the diameter of the fibrous reinforcer is in the range from 2:1 to 40:1, preferably in the range from 3:1 to 30:1 and especially preferably in the range from 5:1 to 20:1, where the length of the fibrous reinforcer and the diameter of the fibrous reinforcer are determined by microscopy by means of image evaluation on samples after ashing, with evaluation of at least 70 000 parts of the fibrous reinforcer after ashing.

The length of the fibrous reinforcer in that case is typically in the range from 5 to 1000 µm, preferably in the range from 10 to 600 µm and especially preferably in the range from 20 to 500 µm, determined by means of microscopy with image evaluation after ashing.

The diameter in that case is, for example, in the range from 1 to 30 µm, preferably in the range from 2 to 20 µm and especially preferably in the range from 5 to 15 µm, determined by means of microscopy with image evaluation after ashing.

In a further preferred embodiment, the at least one reinforcer is in platelet form. In the context of the present invention, "in platelet form" is understood to mean that the particles of the at least one reinforcer have a ratio of diameter to thickness in the range from 4:1 to 10:1, determined by means of microscopy with image evaluation after ashing.

Suitable reinforcers are known to those skilled in the art and are selected, for example, from the group consisting of carbon nanotubes, carbon fibers, boron fibers, glass fibers, glass beads, silica fibers, ceramic fibers, basalt fibers, aluminosilicates, aramid fibers and polyester fibers.

The present invention therefore also provides a method in which component (E) is selected from the group consisting of carbon nanotubes, carbon fibers, boron fibers, glass fibers, glass beads, silica fibers, ceramic fibers, basalt fibers, aluminosilicates, aramid fibers and polyester fibers.

The at least one reinforcer is preferably selected from the group consisting of aluminosilicates, glass fibers, glass beads, silica fibers and carbon fibers.

The at least one reinforcer is more preferably selected from the group consisting of aluminosilicates, glass fibers, glass beads and carbon fibers. These reinforcers may additionally have been epoxy-functionalized.

Suitable silica fibers are, for example, wollastonite.

Suitable aluminosilicates are known as such to the person skilled in the art. Aluminosilicates refer to compounds comprising $Al_2O_3$ and $SiO_2$. In structural terms, a common factor among the aluminosilicates is that the silicon atoms are tetrahedrally coordinated by oxygen atoms and the aluminum atoms are octahedrally coordinated by oxygen atoms. Aluminosilicates may additionally comprise further elements.

Preferred aluminosilicates are sheet silicates. Particularly preferred aluminosilicates are calcined aluminosilicates, especially preferably calcined sheet silicates. The aluminosilicate may additionally have been epoxy-functionalized.

If the at least one reinforcer is an aluminosilicate, the aluminosilicate may be used in any form. For example, it can be used in the form of pure aluminosilicate, but it is likewise possible that the aluminosilicate is used in mineral form. Preferably, the aluminosilicate is used in mineral form. Suitable aluminosilicates are, for example, feldspars, zeolites, sodalite, sillimanite, andalusite and kaolin. Kaolin is a preferred aluminosilicate.

Kaolin is one of the clay rocks and comprises essentially the mineral kaolinite. The empirical formula of kaolinite is $Al_2[(OH)_4/Si_2O_5]$. Kaolinite is a sheet silicate. As well as kaolinite, kaolin typically also comprises further compounds, for example titanium dioxide, sodium oxides and iron oxides. Kaolin preferred in accordance with the invention comprises at least 98% by weight of kaolinite, based on the total weight of the kaolin.

If the sinter powder comprises component (E), it comprises preferably at least 10% by weight of component (E), based on the sum total of the percentages by weight of components (A), (B), (C), (D) and (E), preferably based on the total weight of the sinter powder (SP).

Step ii)

The present invention further provides a method of producing a shaped body, comprising the steps of:
 i) providing a layer of the sinter powder (SP),
 ii) exposing the layer of the sinter powder (SP) provided in step i).

In step ii), the layer of the sinter powder (SP) provided in step i) is exposed.

On exposure, at least some of the layer of the sinter powder (SP) melts. The molten sinter powder (SP) coalesces and forms a homogeneous melt. After the exposure, the molten part of the layer of the sinter powder (SP) cools down again and the homogeneous melt solidifies again.

Suitable methods of exposure include all methods known to one skilled in the art. Preferably, the exposure in step ii) is effected with a radiation source. The radiation source is preferably selected from the group consisting of infrared sources and lasers. Especially preferred infrared sources are near infrared sources.

The present invention therefore also provides a method in which the exposing in step ii) is effected with a radiation source selected from the group consisting of lasers and infrared sources.

Suitable lasers are known to those skilled in the art and are for example fiber lasers, Nd:YAG lasers (neodymium-doped yttrium aluminum garnet laser) or carbon dioxide lasers. The carbon dioxide laser typically has a wavelength of 10.6 µm.

If the radiation source used in the exposing in step ii) is a laser, the layer of the sinter powder (SP) provided in step i) is typically exposed locally and briefly to the laser beam. This selectively melts just the parts of the sinter powder (SP) that have been exposed to the laser beam. If a laser is used in step ii), the method of the invention is also referred to as selective laser sintering. Selective laser sintering is known per se to those skilled in the art.

If the radiation source used in the exposing in step ii) is an infrared source, especially a near infrared source, the wavelength at which the radiation source radiates is typically in the range from 780 nm to 1000 µm, preferably in the range from 780 nm to 50 µm and especially in the range from 780 nm to 2.5 µm.

In the exposing in step ii), in that case, the entire layer of the sinter powder (SP) is typically exposed. In order that only the desired regions of the sinter powder (SP) melt in the exposing, an infrared-absorbing ink (IR-absorbing ink) is typically applied to the regions that are to melt.

The method of producing the shaped body in that case preferably comprises, between step i) and step ii), a step i-1) of applying at least one IR-absorbing ink to at least part of the layer of the sinter powder (SP) provided in step i).

The present invention therefore also further provides a method of producing a shaped body, comprising the steps of
 i) providing a layer of a sinter powder (SP) comprising the following components:
  (A) at least one semicrystalline terephthalate polyester,
  (B) at least one amorphous terephthalate polyester,
  (C) at least one phosphinic salt of the general formula (I),
  (D) optionally at least one additive and
  (E) optionally at least one reinforcer.
 i-1) applying at least one IR-absorbing ink to at least part of the layer of the sinter powder (SP) provided in step i),
 ii) exposing the layer of the sinter powder (SP) provided in step i).

Suitable IR-absorbing inks are all IR-absorbing inks known to the person skilled in the art, especially IR-absorbing inks known to the person skilled in the art for high-speed sintering.

IR-absorbing inks typically comprise at least one absorber that absorbs IR radiation, preferably NIR radiation (near infrared radiation). In the exposing of the layer of the sinter powder (SP) in step ii), the absorption of the IR radiation, preferably the NIR radiation, by the IR absorber present in the IR-absorbing inks results in selective heating of the part of the layer of the sinter powder (SP) to which the IR-absorbing ink has been applied.

The IR-absorbing ink may, as well as the at least one absorber, comprise a carrier liquid. Suitable carrier liquids are known to those skilled in the art and are, for example, oils or solvents.

The at least one absorber may be dissolved or dispersed in the carrier liquid.

If the exposure in step ii) is effected with a radiation source selected from infrared sources and if step i-1) is conducted, the method of the invention is also referred to as high-speed sintering (HSS) or multijet fusion (MJF) method. These methods are known per se to the person skilled in the art.

After step ii), the layer of the sinter powder (SP) is typically lowered by the layer thickness of the layer of the sinter powder (SP) provided in step i) and a further layer of the sinter powder (SP) is applied. This is subsequently exposed again in step ii).

This firstly bonds the upper layer of the sinter powder (SP) to the lower layer of the sinter powder (SP); in addition, the particles of the sinter powder (SP) within the upper layer are bonded to one another by fusion.

In the method of the invention, steps i) and ii) and optionally i-1) can thus be repeated.

By repeating the lowering of the powder bed, the applying of the sinter powder (SP) and the exposure and hence the melting of the sinter powder (SP), three-dimensional shaped bodies are produced. It is possible to produce shaped bodies that also have cavities, for example. No additional support material is necessary since the unmolten sinter powder (SP) itself acts as a support material.

The present invention therefore also further provides a shaped body obtainable by the method of the invention.

Of particular significance in the method of the invention is the melting range of the sinter powder (SP), called the sintering window ($W_{SP}$) of the sinter powder (SP).

The sintering window ($W_{SP}$) of the sinter powder (SP) can be determined by differential scanning calorimetry (DSC) for example.

In differential scanning calorimetry, the temperature of a sample, i.e. in the present case a sample of the sinter powder (SP), and the temperature of a reference are altered linearly over time. For this purpose, heat is supplied to/removed from the sample and the reference. The amount of heat Q necessary to keep the sample at the same temperature as the reference is determined. The amount of heat QR supplied to/removed from the reference serves as a reference value.

If the sample undergoes an endothermic phase transformation, an additional amount of heat Q must be supplied to maintain the sample at the same temperature as the reference. If an exothermic phase transformation takes place, an amount of heat Q has to be removed to keep the sample at the same temperature as the reference. The measurement affords a DSC diagram in which the amount of heat Q supplied to/removed from the sample is plotted as a function of temperature T.

Measurement typically involves initially performing a heating run (H), i.e. the sample and the reference are heated in a linear manner. During the melting of the sample (solid/liquid phase transformation), an additional amount of heat Q has to be supplied to keep the sample at the same temperature as the reference. In the DSC diagram a peak known as the melting peak is then observed.

After the heating run (H), a cooling run (C) is typically measured. This involves cooling the sample and the reference linearly, i.e. heat is removed from the sample and the reference. During the crystallization/solidification of the sample (liquid/solid phase transformation), a greater amount of heat Q has to be removed to keep the sample at the same temperature as the reference, since heat is liberated in the course of crystallization/solidification. In the DSC diagram of the cooling run (C), a peak, called the crystallization peak, is then observed in the opposite direction from the melting peak.

In the context of the present invention, the heating during the heating run is typically effected at a heating rate of 20 K/min. The cooling during the cooling run in the context of the present invention is typically effected at a cooling rate of 20 K/min.

A DSC diagram comprising a heating run (H) and a cooling run (C) is depicted by way of example in FIG. 1. The DSC diagram can be used to determine the onset temperature of melting ($T_M^{onset}$) and the onset temperature of crystallization ($T_C^{onset}$).

To determine the onset temperature of melting ($T_M^{onset}$), a tangent is drawn against the baseline of the heating run (H) at the temperatures below the melting peak. A second tangent is drawn against the first point of inflection of the melting peak at temperatures below the temperature at the maximum of the melting peak. The two tangents are extrapolated until they intersect. The vertical extrapolation of the intersection to the temperature axis denotes the onset temperature of melting ($T_M^{onset}$).

To determine the onset temperature of crystallization ($T_C^{onset}$), a tangent is drawn against the baseline of the cooling run (C) at the temperatures above the crystallization peak. A second tangent is drawn against the point of inflection of the crystallization peak at temperatures above the temperature at the minimum of the crystallization peak. The two tangents are extrapolated until they intersect. The vertical extrapolation of the intersection to the temperature axis indicates the onset temperature of crystallization ($T_C^{onset}$).

The sintering window (W) results from the difference between the onset temperature of melting ($T_M^{onset}$) and the onset temperature of crystallization ($T_C^{onset}$). Thus:

$$W = T_M^{onset} - T_C^{onset}.$$

In the context of the present invention, the terms "sintering window ($W_{SP}$)", "size of the sintering window (WSP)" and "difference between the onset temperature of melting ($T_M^{onset}$) and the onset temperature of crystallization ($T_C^{onset}$)" have the same meaning and are used synonymously.

The sinter powder (SP) of the invention is of particularly good suitability for use in a sintering method.

The present invention therefore also provides for the use of a sinter powder (SP) comprising the following components:
(A) at least one semicrystalline terephthalate polyester,
(B) at least one amorphous terephthalate polyester,
(C) at least one phosphinic salt of the general formula (I),
(D) optionally at least one additive and
(E) optionally at least one reinforcer in a sintering method or in a fused filament fabrication method. Preference is given to the use of the sinter powder (SP) in a sintering method.

Shaped Bodies

The method of the invention affords a shaped body. The shaped body can be removed from the powder bed directly after the solidification of the sinter powder (SP) molten on exposure in step ii). It is likewise possible first to cool the shaped body and only then to remove it from the powder bed. Any adhering particles of the sinter powder that have not been melted can be mechanically removed from the surface by known methods. Methods for surface treatment of the shaped body include, for example, vibratory grinding or barrel polishing, and also sandblasting, glass bead blasting or microbead blasting.

It is also possible to subject the shaped bodies obtained to further processing or, for example, to treat the surface.

The present invention therefore further provides a shaped body obtainable by the method of the invention.

The shaped bodies obtained typically comprise in the range from 50% to 90% by weight of component (A), in the range from 5% to 25% by weight of component (B), in the range from 5% to 25% by weight of component (C), in the range from 0% to 10% by weight of component (D) and in the range from 0% to 40% by weight of component (E), based in each case on the total weight of the shaped body.

The shaped body preferably comprises in the range from 55% to 83.9% by weight of component (A), in the range from 8% to 23% by weight of component (B), in the range from 8% to 23% by weight of component (C), in the range from 0.1% to 2.5% by weight of component (D) and in the range from 0% to 28.9% by weight of component (E), based in each case on the total weight of the shaped body.

The shaped body most preferably comprises in the range from 60% to 79.9% by weight of component (A), in the range from 10% to 20% by weight of component (B), in the range from 10% to 20% by weight of component (C), in the range from 0.1% to 2% by weight of component (D) and in the range from 0% to 19.9% by weight of component (E), based in each case on the total weight of the shaped body.

In general, component (A) is the component (A) that was present in the sinter powder (SP). It is likewise the case that component (B) is the component (B) that was present in the sinter powder (SP), the component (C) is the component (C) that was present in the sinter powder (SP), the component (D) is the component (D) that was present in the sinter powder (SP), and the component (E) is the component (E) that was present in the sinter powder (SP).

If step i-1) has been conducted, the shaped body additionally typically comprises the IR-absorbing ink.

It will be clear to the person skilled in the art that, as a result of the exposure of the sinter powder (SP), components (A), (B) and (C) and any (D) and (E) can enter into chemical reactions and be altered as a result. Such reactions are known to those skilled in the art.

Preferably, components (A), (B) and (C) and any (D) and (E) do not enter into any chemical reaction on exposure in step ii); instead, the sinter powder (SP) merely melts.

The invention is elucidated in detail hereinafter by examples, without restricting it thereto.

EXAMPLES

The following components are used:
Component (A): semicrystalline terephthalate polyester; Ultradur® B4500, BASF SE (polybutylene terephthalate)
Component (B): amorphous terephthalate polyester; Genius 72, Selenis (a glycol-modified polyethylene terephthalate)
Component (B1): amorphous polycarbonate; Makrolon 2805, Covestro (polycarbonate) Component (C): phosphinic salt; Exolit OP935, Clariant (aluminum diethylphosphinate)
Component (D): antioxidant; Irganox® 245, BASF SE (sterically hindered phenol)
Test Methods:
Discoloration after storage is determined by visual assessment by a rating system of 1 (best) and 5 (worst).

Zero shear rate viscosity $\eta_0$ was determined with a "DHR-1" rotary viscometer from TA Instruments and a plate-plate geometry with a diameter of 25 mm and a plate separation of 1 mm. Unequilibrated samples were dried at 80° C. under reduced pressure for 7 days and these were then analyzed with a time-dependent frequency sweep with an angular frequency range from 500 to 0.5 rad/s. The following additional analysis parameters were used:

Deformation: 1.0%,
Measurement temperature: 240° C.,
Measurement time: 20 min,
Preheating time after sample preparation: 1.5 min.

To determine the thermooxidative stability of the sinter powders, the complex shear viscosity of freshly produced sinter powders and of sinter powders after oven aging at 0.5% oxygen and 195° C. for 16 hours was determined. The ratio of viscosity after storage (after aging) to the viscosity before storage (before aging) was determined. The viscosity is measured by means of rotary rheology at a measurement frequency of 0.5 rad/s at a temperature of 240° C.

The abovementioned components were compounded in an extruder in the amounts specified in table 1 and subsequently ground in a pinned disk mill to a particle size (D50) in the region of less than 200 μm. The physical properties are shown in table 2.

TABLE 1

| Example/comparative example | Component A (% by wt.) | Component B (% by wt.) | Component C | Component B1 | Component D (% by wt.) |
|---|---|---|---|---|---|
| CE 1 | 99.75 | 0 | — | — | 0.25 |
| CE 2 | 89.75 | 10 | — | — | 0.25 |
| CE 3 | 87.75 | 0 | 12 | — | 0.25 |
| E 4 | 77.75 | 10 | 12 | — | 0.25 |
| E 5 | 72.75 | 15 | 12 | — | 0.25 |
| E 6 | 67.75 | 20 | 12 | — | 0.25 |
| CE 7 | 77.75 | — | 12 | 10 | 0.25 |
| CE 8 | 89.75 | — | — | 10 | 0.25 |

TABLE 2

| Example | Complex shear viscosity at 0.5 rad/s, 240° C. (Pas) | Viscosity ratio after thermo-oxidative storage (16 h, 195° C., 0.5% $O_2$) | Tm1, ° C. | Tk1, ° C. | Sintering window (onset) W, K | Discoloration after storage |
|---|---|---|---|---|---|---|
| CE 1 | 582 | 7.0 | 222.4 | 196.3 | 18.1 | 1 |
| CE 2 | 597 | 2.6 | 221.5 | 190.1 | 19.3 | 2 |
| CE 3 | 1010 | 5.9 | 221.8 | 194.0 | 19.2 | 3 |
| E 4 | 962 | 3.4 | 221.4 | 187.9 | 24.0 | 2 |
| E 5 | 800 | 3.0 | 221.1 | 183.0 | 26.9 | 2 |
| E 6 | 1000 | 3.5 | 221.5 | 180.1 | 30.3 | 2 |
| CE 7 | 2430 | 0.2 | 220.5 | 188.3 | 21.8 | 4 |
| CE 8 | 691 | 3.1 | 221.5 | 188.3 | 22.7 | 3 |

Scale for discoloration after thermo-oxidative storage:
1—very low;
2—low;
3—moderate;
4—adequate;
5—inadequate.

The sinter powders (SP) of the invention have a broadened sintering window and additionally also show good color values after storage. In addition, the shaped bodies (components) produced by the method of the invention have good flame retardancy. The sinter powders (SP) of the invention additionally have improved storage stability.

The invention claimed is:

1. A sinter powder (SP) comprising the following components:
   (A) at least one semicrystalline terephthalate polyester,
   (B) at least one amorphous terephthalate polyester,
   (C) at least one phosphinic salt of the general formula (I)

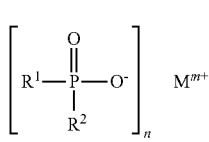

(I)

in which $R^1$ and $R^2$ are independently hydrogen or $C_1$-$C_8$-alkyl;
   M is $(C_1$-$C_4$-alkyl$)_4$N, $(C_1$-$C_4$-alkyl$)_3$NH, $(C_2$-$C_4$-alkylOH$)_4$N, $(C_2$-$C_4$alkylOH$)_3$NH, $(C_2$-$C_4$-alkylOH$)_2$N$(CH_3)_2$, $(C_2$-$C_4$-alkylOH$)_2$NHCH$_3$, $(C_6H_5)_4$N, $(C_6H_5)$NH, $(C_6H_4CH_3)_4$N, $(C_6H_4CH_3)_3$NH, NH$_4$, an alkali metal ion, an alkaline earth metal ion, an aluminum ion, a zinc ion, an iron ion or a boron ion;
   m is 1, 2 or 3 and indicates the number of positive charges of M; and
   n is 1, 2 or 3 and indicates the number of phosphinic anions, wherein
   the amorphous terephthalate polyester (B) comprises not more than 2.5% by weight of crystalline terephthalate polyester, based on the total weight of the amorphous terephthalate polyester (B).

2. The sinter powder (SP) according to claim 1, which comprises in the range from 50% to 90% by weight of component (A), in the range from 5% to 25% by weight of component (B) and in the range from 5% to 25% by weight of component (C), based in each case on the sum total of the percentages by weight of (A), (B) and (C).

3. The sinter powder (SP) according to claim 1, wherein the at least one semicrystalline terephthalate polyester (component A) is selected from the group consisting of polyethylene terephthalate (PET) and polybutylene terephthalate (PBT).

4. The sinter powder (SP) according to claim 1, wherein component (C) is a phosphinic salt of the formula (I')

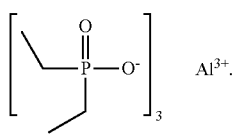

(I')

5. The sinter powder (SP) according to claim 1, wherein the at least one amorphous terephthalate polyester (component B) is an amorphous polyethylene terephthalate ester.

6. The sinter powder (SP) according to claim 1, wherein the sinter powder has a median particle size (D50) in the range from 10 to 250 μm.

7. The sinter powder (SP) according to claim 1, wherein the sinter powder (SP) has
   a D10 in the range from 10 to 60 μm,
   a D50 in the range from 25 to 90 μm and
   a D90 in the range from 50 to 150 μm.

8. The sinter powder (SP) according to claim 1, wherein the sinter powder (SP) has a melting temperature ($T_M$) in the range from 150 to 260° C.

9. The sinter powder (SP) according to claim 1, wherein the sinter powder (SP) has a crystallization temperature ($T_C$) in the range from 110 to 210° C.

10. The sinter powder (SP) according to claim 1, wherein the sinter powder (SP) has a sintering window ($W_{SP}$), where the sintering window ($W_{SP}$) is the difference between the onset temperature of melting ($T_M^{onset}$) and the onset temperature of crystallization ($T_C^{onset}$) and where the sintering window ($W_{SP}$) is in the range from 10 to 40 K.

11. A process for producing a sinter powder (SP), comprising the steps of
   a) mixing the following components:
      (A) at least one semicrystalline terephthalate polyester,
      (B) at least one amorphous terephthalate polyester,
      (C) at least one phosphinic salt of the general formula (I)

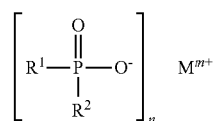

(I)

in which $R^1$ and $R^2$ are independently hydrogen or $C_1$-$C_8$-alkyl;
   M is $(C_1$-$C_4$-alkyl$)_4$N, $(C_1$-$C_4$-alkyl$)_3$NH, $(C_2$-$C_4$-alkylOH$)_4$N, $(C_2$-$C_4$alkylOH$)_3$NH, $(C_2$-$C_4$-alkylOH$)_2$N$(CH_3)_2$, $(C_2$-$C_4$-alkylOH$)_2$NHCH$_3$, $(C_6H_5)_4$N, $(C_6H_5)$NH, $(C_6H_4CH_3)_4$N, $(C_6H_4CH_3)_3$NH, NH$_4$, an alkali metal ion, an alkaline earth metal ion, an aluminum ion, a zinc ion, an iron ion or a boron ion;
   m is 1, 2 or 3 and indicates the number of positive charges of M; and
   n is 1, 2 or 3 and indicates the number of phosphinic anions; and
   b) grinding the mixture obtained in step a) to obtain the sinter powder (SP).

12. A method of producing a shaped body, comprising the steps of:
   i) providing a layer of a sinter powder (SP) according to claim 1,
   ii) exposing the layer of the sinter powder (SP) provided in step i).

13. The use of a sinter powder (SP) according to claim 1 in a sintering method or in a fused filament fabrication method.

14. A shaped body obtainable by a method according to claim 12.

15. The use of a phosphinic salt of the general formula (I)

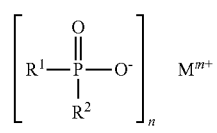

(I)

in which $R^1$ and $R^2$ are independently hydrogen or $C_1$-$C_8$-alkyl;
   M is $(C_1$-$C_4$-alkyl$)_4$N, $(C_1$-$C_4$-alkyl$)_3$NH, $(C_2$-$C_4$-alkylOH$)_4$N, $(C_2$-$C_4$alkylOH$)_3$NH, $(C_2$-$C_4$-alkylOH$)_2$N$(CH_3)_2$, $(C_2$-$C_4$-alkylOH$)_2$NHCH$_3$, $(C_6H_5)_4$N, $(C_6H_5)$NH, $(C_6H_4CH_3)_4$N, $(C_6H_4CH_3)_3$NH, NH$_4$, an alkali metal ion, an alkaline earth metal ion, an aluminum ion, a zinc ion, an iron ion or a boron ion;

m is 1, 2 or 3 and indicates the number of positive charges of M; and n is 1, 2 or 3 and indicates the number of phosphinic anions, for broadening the sintering window ($W_{SP}$) of a sinter powder (SP).

* * * * *